United States Patent [19]

Loper

[11] Patent Number: 5,558,683
[45] Date of Patent: Sep. 24, 1996

US005558683A

[54] MANNICH BASE DERIVATIVES, AND THE PRODUCTION AND USES THEREOF

[75] Inventor: John T. Loper, Richmond, Va.

[73] Assignee: Ethyl Corporation, Richmond, Va.

[21] Appl. No.: 407,726

[22] Filed: Mar. 20, 1995

[51] Int. Cl.$^6$ ...................................................... C10L 1/22
[52] U.S. Cl. ................................... 44/415; 564/47; 44/417
[58] Field of Search ........................ 44/415, 417; 564/47

[56] References Cited

U.S. PATENT DOCUMENTS

| | | | |
|---|---|---|---|
| 3,413,347 | 11/1968 | Worrel | 260/570.5 |
| 3,725,277 | 4/1973 | Worrel | 252/51.5 R |
| 3,734,965 | 5/1973 | Becker | 260/570.5 P |
| 3,948,619 | 4/1976 | Worrel | 44/58 |
| 4,006,089 | 2/1977 | Chibnik | 252/51.5 R |
| 4,083,699 | 4/1978 | Chibnik | 44/75 |
| 4,160,648 | 7/1979 | Lewis et al. | 44/63 |
| 4,197,409 | 4/1980 | Lilburn | 560/158 |
| 4,231,759 | 11/1980 | Udelhofen et al. | 44/75 |
| 4,398,921 | 8/1983 | Rifkin et al. | 44/56 |
| 4,508,541 | 4/1985 | Kaufman et al. | 44/71 |
| 4,604,103 | 8/1986 | Campbell | 44/72 |
| 4,747,851 | 5/1988 | Sung et al. | 44/72 |
| 4,787,996 | 11/1988 | Horodysky et al. | 252/51.5 R |
| 4,944,770 | 7/1990 | Sung | 44/73 |
| 5,039,310 | 8/1991 | Blain et al. | 44/424 |
| 5,098,986 | 3/1992 | Speranza et al. | 528/149 |
| 5,387,266 | 2/1995 | Loper | 44/415 |
| 5,413,614 | 5/1995 | Cheyseck | 44/415 |
| 5,482,523 | 1/1996 | Cheyseck | 44/415 |

*Primary Examiner*—Jacqueline V. Howard
*Attorney, Agent, or Firm*—Dennis H. Rainear

[57] ABSTRACT

Compounds are described in which a phenolic moiety is linked to a polyamine moiety by means of a Mannich base linkage, and the polyamine moiety is linked to an alkylene-poly(oxyalkylene) moiety by means of a urea linkage in which one of the nitrogen atoms of the urea linkage is a nitrogen atom of the polyamine. These compounds useful as detergent/dispersants in fuels and other media.

25 Claims, No Drawings

MANNICH BASE DERIVATIVES, AND THE PRODUCTION AND USES THEREOF

TECHNICAL FIELD

This invention relates to novel Mannich base derivatives that can be used as fuel and lubricant additives.

BACKGROUND

Over the years a considerable amount of effort has been devoted to the discovery and development of chemical products having detergent and/or dispersant properties when used in hydrocarbonaceous fuels and/or natural and synthetic oils of lubricating viscosity. Fuel-soluble detergents are used in order to control the amount and character of deposits which tend to form in the fuel induction system of internal combustion engines. Oil-soluble detergent-dispersants are widely used in lubricating oils to control deposit and varnish formation, and to keep sludge and other solid matter is suspension in the oil. A small sampling of efforts along these lines is reflected in U.S. Pat. Nos. 3,413,347; 3,725,277; 3,948,619; 4,006,089; 4,083,699; 4,160,648; 4,197,409; 4,231,759; 4,398,921; 4,508,541; 4,604,103; 4,747,851; 4,787,996; 4,944,770; and 5,039,310.

The concomitant advent of Government regulations on engine emissions, the development of engines that operate at higher temperatures and with more sophisticated fuel induction systems, and the increasing use of new fuel blending components such as alcohols and ethers, has engendered the search for new, highly effective detergent-dispersant additives for use in fuels and lubricants.

THE INVENTION

This invention is based on the discovery that novel compounds can be formed by suitably linking together appropriate molecular segments in an appropriate sequence by means of appropriate linkages. The resultant condensation products, while complicated from a structural point of view, can be readily prepared in high yield by relatively simple processing using readily available starting materials.

In brief, the products of this invention contain at least three distinct and highly important segments, namely a phenolic moiety, a polyamine moiety and an alkylenepoly(oxyalkylene) moiety. The phenolic moiety is linked to the polyamine moiety by means of a Mannich base linkage, and the polyamine moiety is linked to the alkylene-poly(oxyalkylene) moiety by means of a urea linkage in which one of the nitrogen atoms of the urea linkage is a nitrogen atom of the polyamine.

In one of its forms, this invention involves the provision of a compound of the formula:

R—L—A—L'—R'     (1)

wherein R is a phenolic group (e.g., a hydroxyaryl group, preferably a hydroxyphenyl group) derived from a hydroxyaromatic compound; A is a polyamine group having 2 to 10 nitrogen atoms, and is derived from a polyamine; R' is an alkylenepoly(oxyalkylene) group derived from an amino-substituted alkylenepoly(oxyalkylene) compound, and in which the alkylene groups can be the same or different and contain from 2 to 20 carbon atoms each; L is a methyleneamino linkage (i.e., a Mannich base linkage) which the amino nitrogen atom is one of the nitrogen atoms of the polyamine group; and L' is a urea linkage in which one of the nitrogen atoms of L' is one of the nitrogen atoms of the polyamine group. The other nitrogen atom of L' is a nitrogen atom of an amino group bonded to the alkylenepoly(oxyalkylene) group.

Linkage L may be depicted as follows:

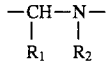

where $R_1$ and $R_2$ can be the same or different and each individually is a hydrogen atom or a carbon-bonded organic group (preferably a hydrocarbyl group). Most preferably $R_1$ and $R_2$ are both hydrogen atoms. Linkage L' may be depicted as follows:

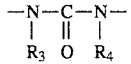

where $R_3$ and $R_4$ can be the same or different and each individually is a hydrogen atom or a carbon-bonded organic group (preferably a hydrocarbyl group). Most preferably $R_3$ and $R_4$ are both hydrogen atoms.

The alkylene groups in the compounds of formula (1) can be the same or different and contain from 2 to 20 carbon atoms each, and the average number of oxyalkylene groups in the compound will typically be in the range of 2 to about 150, preferably in the range of 2 to about 100, more preferably in the range of about 5 to about 90, and most preferably in the range of about 10 to about 80. The terminal alkylene or oxyalkylene group(s) not bonded to the nitrogen atom of the urea linkage, L', will typically be substituted by an amino, hydroxyl or other terminal substituent present in the amino-substituted alkylenepoly(oxyalkylene) compound from which R' is derived.

One preferred embodiment is compounds of formula (1) above wherein R, L, A, and L' are as defined above and R' is an amino-substituted alkylenepoly(oxyalkylene) group derived by removal of one amino hydrogen atom from a polyamino-substituted alkylenepoly(oxyalkylene) compound of the formula:

$$H_2N\text{-alkylene-}(O\text{-alkylene})_x\text{—}NH_2 \quad (2)$$

wherein the alkylene groups can be the same or different and contain from 2 to 20 carbon atoms each, and x is an average number in the range of 2 to about 150, preferably in the range of 2 to about 100, more preferably in the range of about 5 to about 90, and most preferably in the range of about 10 to about 80.

Another preferred embodiment is compounds of formula (1) above wherein R, L, A, and L' are as defined above and R' is an amino-substituted alkylenepoly(oxyalkylene) group derived by removal of one amino hydrogen atom from a polyamino-substituted alkylenepoly(oxyalkylene) compound of the formula:

$$H_2N\text{-alkylene-}(O\text{-alkylene})_y\text{—}NH\text{—}CO\text{—}NH\text{—}(O\text{-alkylene})_z\text{-alkylene-}NH_2 \quad (3)$$

wherein the alkylene groups can be the same or different and contain from 2 to 20 carbon atoms each, and y and z can be the same or different and each is typically an average number in the range of from 2 to 20.

Still another preferred embodiment is compounds of formula (1) above wherein R, L, A, and L' are as defined above and R' is a polyamino-substituted alkylenepoly(oxyalkylene) group derived by removal of one amino hydrogen atom from a polyamino-substituted alkylenepoly(oxyalkylene) compound of the formula:

 (4)

where Q is the hydrocarbyl residue of a triol initiator such as trimethylol propane, trimethylol butane, triethylol propane, glycerine, etc., "alkylene" is as defined above, and a, b and c can be the same or different and each is typically an average number in the range of from 1 to about 35. Usually, the sum of a, b and c is in the range of about 5 to about 100. It will be noted that oxyalkylene triamines of the type of formula (4) are typically formed by reacting an alkylene oxide with triol initiator (e.g., trimethylol propane, glycerine, etc.) and aminating the terminal hydroxyl groups.

In the compounds of this invention, the phenolic group, R, is preferably substituted on the ring by one or more hydrocarbyl groups—e.g., aliphatic or cycloaliphatic groups—each of which is free of acetylenic unsaturation. While the ring can thus be substituted, for example, by up to four acyclic hydrocarbyl substituents such as methyl or ethyl groups, usually the ring will have less than four acyclic hydrocarbyl substituents, and typically will have from 1 to 2 such substituents.

Preferred compounds of this invention are as depicted and described above wherein R is an hydrocarbylphenolic group derived from a phenolic compound having at least one hydrocarbyl substituent, most preferably an aliphatic group that is saturated or substantially saturated, having from about 4 to about 100 carbon atoms; A is a polyamine group having 2 to about 6 (or an average between 2 and 6) of nitrogen atoms, most preferably derived from an alkylene polyamine; R' is an alkylenepoly(oxyalkylene) group derived from an amino-substituted alkylenepoly(oxyalkylene) compound in which the alkylene groups can be the same or different and contain 2 to 10, more preferably 2 to 5 and still more preferably 3 to 4 carbon atoms each; and L and L' are as described above. R will preferably contain a single alkyl substituent having about 8 to about 100 carbon atoms (most preferably in the para-position) or, alternatively and less preferably, two alkyl substituents each having about 4 to about 20 carbon atoms (most preferably in the two ortho-positions or one each in an ortho-position and the para-position.

The compounds of described above can be formed in a two-step process. The first step involves preparing a Mannich base by a Mannich condensation reaction among a phenolic compound, an aldehyde such as formaldehyde, acetaldehyde, propionaldehyde, furfuryl aldehyde, etc. (preferably formaldehyde or a formaldehyde-producing reagent such as paraformaldehyde), and a suitable polyamine having terminal primary or secondary nitrogen atoms, preferably two or more terminal primary amino groups. In the second step the Mannich base so formed is reacted with a dialkyl carbonate or phosgene followed by reaction with a suitable amino-substituted alkylene-poly(oxyalkylene) compound whereby the desired product is formed via (a) bonding of the polyamine portion of the Mannich base by one of its nitrogen atoms to the carbonyl group of the urea linkage being formed, and (b) bonding of a nitrogen atom of the amino-substituted alkylene-poly(oxyalkylene) compound to the carbonyl group of the urea linkage being formed.

Additional embodiments of this invention comprise compounds of the formula:

 (5)

where R, L, A, and L' are as defined above, n is 2 or 3 (or an average number between 2 and 3) and R' is an alkylenepoly(oxyalkylene) group derived by removal from a polyamino-substituted alkylenepoly(oxyalkylene) compound of a number of amino hydrogen atoms equal to n. Thus the polyamino-substituted alkylenepoly(oxyalkylene) compound used in forming compounds of formula (5) will of course have at least that number of removable amino hydrogen atoms (i.e., hydrogen atoms that can participate in the creation of the urea linkage, L'. To prepare these compounds the above two-step process is used but modified by proportioning the reactants in the second step such that there is sufficient product of the Mannich base-dialkyl carbonate or Mannich base-phosgene reaction to react with 2 or 3 (or an average between 2 and 3) of removable hydrogen atoms of the polyamino-substituted alkylenepoly(oxyalkylene) compound. For example, to form a product of formula (5) wherein n is 2, two mols of the product from the reaction of dialkyl carbonate or phosgene with an equimolar amount of the Mannich base in the first step are reacted per mol of the polyamino-substituted alkylenepoly(oxyalkylene) compound having 2 or 3 (or an average between 2 and 3) of removable hydrogen atoms.

The above and other embodiments of this invention will be still further apparent from the ensuing description and appended claims.

Phenolic Compounds

While the phenolic compound can be phenol itself, preferably it is substituted on the ring by from 1 to 4, more preferably by from 1 to 3, and still more preferably by from 1 to 2 hydrocarbyl groups. Such hydrocarbyl groups can range from lower alkyl or alkenyl groups (viz., alkyl groups of 1 to about 6 carbon atoms or alkenyl groups of 2 to about 6 carbon atoms) up to long chain hydrocarbyl groups having 500 or more carbon atoms such as alkyl or alkenyl groups derived from polypropenes, polybutenes, polyisobutenes, polyamylenes, copolymers of ethylene and propylene, copolymers of ethylene and butene, copolymers of ethylene and isobutene, copolymers of propene and isobutene, copolymers of propene, butene and isobutene, and the like, having number average molecular weights of up to about 3000 or more. The hydrocarbyl group(s) can also be cycloalkyl or cycloalkenyl groups, aryl groups, aralkyl groups, polyunsaturated aliphatic hydrocarbyl groups, or the like. The number of hydrocarbyl groups present on the phenolic ring (which cannot exceed four) will to some extent be dependent upon steric factors such as the size and structure of the hydrocarbyl group. When substituted, the phenolic compound will usually have one or two hydrocarbyl groups. In many cases the longer chain hydrocarbyl group(s) will be bonded to the phenolic ring by a secondary or tertiary carbon atom. On the other hand, the short chain hydrocarbyl group(s) will be bonded to the phenolic ring by primary, secondary or tertiary carbon atoms. Typically, the phenolic compound used will have its para position and/or at least one ortho position unsubstituted (except by a hydrogen atom), and at least one such position will be sufficiently unhindered as to be capable of undergoing the Mannich reaction with the aldehyde and a polyamine.

Thus the phenolic moiety can be derived from such phenols as o- and/or p-tert-amylphenol; o-benzylphenol; p-benzylphenol; p-sec-butylphenol; o-tert-butylphenol; p-tert-butylphenol; o-cyclohexylphenol; o-cyclohexenylphenol; p-octylphenol (where the octyl group is derived from isobutene dimer); p-nonylphenol (where the nonyl group is derived from propene trimer); p-dodecylphenol (where the dodecyl group is derived from isobutene trimer); monoalkylated phenols derived from oligomers or polymers of propene having from 4 up to about 100 propene units per molecule; monoalkylated phenols derived from oligomers or polymers of isobutene, having from 4 up to about 100 isobutene units per molecule; monoalkylated o-, m-, and/or p-cresol wherein the alkyl group is derived from propene dimer, propene trimer, and/or higher oligomers or polymers of propene; monoalkylated o-, m-, and/or p-cresol wherein the alkyl group is derived from isobutene dimer, isobutene trimer, and/or higher oligomers or polymers of isobutene; monoalkylated o-cyclohexylphenol wherein the alkyl group on the phenolic ring is derived from propene dimer, propene trimer, and/or higher oligomers or polymers of propene; monoalkylated o-cyclohexylphenol wherein the alkyl group on the phenolic ring is derived from isobutene dimer, isobutene trimer, and/or higher oligomers or polymers of isobutene; monoalkylated p-benzylphenol wherein the alkyl group on the phenolic ring is derived from propene dimer, propene trimer, and/or higher oligomers or polymers of propene; monoalkylated p-benzylphenol wherein the alkyl group on the phenolic ring is derived from isobutene dimer, isobutene trimer, and/or higher oligomers or polymers of isobutene; o-, m- and/or p-phenylphenol wherein the alkyl group on the phenolic ring is derived from propene dimer, propene trimer, and/or higher oligomers or polymers of propene; monoalkylated p-phenylphenol wherein the alkyl group on the phenolic ring is derived from isobutene dimer, isobutene trimer, and/or higher oligomers or polymers of isobutene; o-, m-, and/or p-styrylphenol wherein the alkyl group on the phenolic ring is derived from propene dimer, propene trimer, and/or higher oligomers or polymers of propene; monoalkylated p-styrenated phenol wherein the alkyl group on the phenolic ring is derived from isobutene dimer, isobutene trimer, and/or higher oligomers or polymers of isobutene; o-, m-, and/or p-cyclopentenylphenol wherein the alkyl group on the phenolic ring is derived from propene dimer, propene trimer, and/or higher oligomers or polymers of propene; monoalkylated p-cyclopentenylphenol wherein the alkyl group on the phenolic ring is derived from isobutene dimer, isobutene trimer, and/or higher oligomers or polymers of isobutene; and the like. One preferred type of phenolic compounds for use in forming the compounds of this invention are monoalkylated phenols derived from polymers of propene having a molecular weight by vapor phase osmometry in the range of about 800 to about 1000.

Suitable trihydrocarbyl phenols and tetrahydrocarbyl phenols are exemplified by 2,3,4-trimethylphenol; 2,3,5-trimethylphenol; 2,3,5-trimethylphenol; 2,3,4-triethylphenol; 2,3,5-triethylphenol; 2,3,5-triethylphenol; 6-tert-butyl-2,3-dimethyl phenol; 2,3- and/or 2,5-xylenol alkylated in the 4- or 6-position by an alkyl group derived from propene dimer, propene trimer, and/or higher oligomers or polymers of propene; 2,3- and/or 2,5-xylenol alkylated in the 4- or 6-position by an alkyl group derived from isobutene dimer, isobutene trimer, and/or higher oligomers or polymers of isobutene; 2,3,5-trimethylphenol alkylated in the 4- or 6-position by an alkyl group derived from propene dimer, propene trimer, and/or higher oligomers or polymers of propene; 2,3,5-trimethylphenol alkylated in the 4- or 6-position by an alkyl group derived from an oligomer or polymer of ethylene and propene or of ethylene and isobutene; 2,3,4,5-tetramethylphenol; 2,3,5,6-tetramethylphenol; 2,6-diethyl-3,5-dimethylphenol; and the like.

Preferred dialkylphenols for use in preparing the compounds of this invention include 2-methyl-6-tert-butylphenol, 2,6-diisopropylphenol, 2,6-di-tert-butylphenol, 2-methyl-4-tert-butylphenol, 2-tert-butyl-4-methylphenol, 2,4-diisopropylphenol, 2,4-di-tert-butylphenol, 2-methyl-6-tert-amylphenol, 2-methyl-4-tert-amylphenol, 2-ethyl-6-tert-butylphenol, 2-tert-butyl-4-ethylphenol, and like compounds wherein the two alkyl groups contain a total of up to about 30 carbon atoms.

The phenolic compound can be a fused ring compound such as 1-naphthol, 2-naphthol, and their suitable hydrocarbyl-substituted analogs. Likewise use can be made of diphenolic compounds such as the dihydroxydiphenyls and their suitable hydrocarbyl-substituted analogs, and the alkylene-bridged dihydroxydiphenyls and their suitable hydrocarbyl-substituted analogs, and like compounds, provided that the hydroxyaromatic compound is able to undergo the Mannich reaction with the aldehyde and polyamine selected for use therewith.

Aldehydes

Aldehydes useful in the Mannich reaction for forming the Mannich base intermediates are typified by acetaldehyde, propionaldehyde, butyraldehyde, furfuryl aldehyde, cinnamaldehyde, decyl aldehyde, citral, crotonaldehyde, acrolein, glyoxal, heptaldehyde, methacrolein, tetradecyl aldehyde, and the like. The preferred aldehydes are formaldehyde and formaldehyde-producing reagents such as paraformaldehyde and formalin.

Polyamines

The polyamines can be and preferably are hydrocarbyl amines although they can contain one or more suitable substituents such as ether oxygen atoms (—O—), hydroxyl groups (—OH), thioether sulfur atoms (—$S_n$—), mercapto groups (—SH), halogen atoms (—X), keto groups (>CO), thioketo groups (>CS), carboxyl groups (—COOH), ester groups (—COOR), nitrilo groups (—CN), thiocyano groups (—SCN), nitro groups (—$NO_2$), hereto nitrogen atoms (—N═), and the like, provided that each substituted hydrocarbyl group of the amine retains its predominantly hydrocarbonaceous character. When substituted polyamines are used, they preferably have one or more ether oxygen linkages, one or more thioether linkages, one or more hetero nitrogen atoms and/or one or more hydroxyl groups.

Illustrative polyamines which may be employed in forming the compounds of this invention include such compounds as tetraaminoneopentane; 1-(β-aminoethyl)-2-imidazolidone, N,N'-di(β-aminoethyl)imidazolidone- 2; 2-(2-aminoethylamino)-5-nitropyridine; 3-amino-N-ethylpiperidine; 2-(2-aminoethyl)-pyridine; 5-aminoindole; 3-amino- 5-mercapto-1,2,4-triazole; N-aminoethylpiperazine; N,N'-bis(aminoethyl)piperazine; 4-(aminomethyl)-piperidine; ethylenediamine; 1,2-propylenediamine; 1,3-propylene diamine; methylaminopropylenediamine; dipropylenetriamine; di-(1,2-butylene)triamine; N-(2-aminoethyl)- 1,3-propanediamine; hexamethylenediamine; N-(β-cyanoethyl)ethane- 1,2-diamine; 1,3,6,9-tetraaminooctadecane; 1,3,6-triamino- 9-oxadecane; N-methyl-1,2-propanediamine; tetra-(1,2-propylene)pentamine; diethylenetriamine; triethylenetetramine; tetraethylenepentamine; pentaethylenehexamine; adenine; cytosine; guanidine; aminoguanidine; guanylurea; N-(2-aminoethyl)-piperidine; N-(2-aminoethyl)-pyrrolidine; 1,7-diaminoheptane; 1,8-diaminooctane; 1,10-diaminodecane; 1,12-diaminododecane; 3,3-diaminodipropylamine; p-phenylenediamine; N,N'-diaminoguanidine; 1,3-diamino-N-(β-hydroxyethyl)propane; 4,5-diamino-6-hydroxy-2-mercaptopyrimidine; 1,3-diamino-2-propanol; 2,4-diamino-6-hydroxypyrimidine; 1,8-diamino-p-menthane; 4,6-diamino-2-mercaptopyrimidine; 1,4-diaminopiperazine; 2,6-diaminopyridine; 3,4-diaminopyridine; 3,5-diamino-1,2,4-triazole; 2,4,6-triaminopyrimidine; triaminoguanidine; amine-terminated polyalkylene glycols (e.g., Jeffamine® D-230, D-400, D-2000, D-4000 and DB-2001 diamines); urea condensates of amine-terminated polyalkylene glycols (e.g., Jeffamine® DU-700 urea condensate); amine-terminated polyether diamines (e.g., Jeffamine® EU-600, ED-900, ED-2001, ED-4000, ED-6000, and EDR-148 diamines); alkylene oxide-based triamines (e.g., Jeffamine® T-403, T-3000, T-5000 triamines); and the like.

It should be apparent from these illustrative compounds that the polyamines can be aliphatic, cycloaliphatic, aromatic, heterocyclic, aliphatic and cycloaliphatic, aliphatic and aromatic, aliphatic and heterocyclic, cycloaliphatic and aromatic, cycloaliphatic and heterocyclic, aromatic and heterocyclic, etc., in structure; that they may be saturated or contain olefinic, acetylenic and/or aromatic unsaturation; and that they may or may not contain other functional substituents, as long as the compound contains at least one amino group capable of forming a Mannich base linkage, and at least one amino group capable of forming a urea linkage. Mixtures of suitable polyamines can be used, such as for example, commercial mixtures of straight chain, branched chain and cyclic ethylene polyamines having approximate overall compositions falling in the range corresponding to diethylene triamine to pentaethylene hexamine. The compounds of this invention can be formed from polyamines having combinations of primary and secondary and/or tertiary amino groups in the molecule. In general, compounds formed from polyamines having at least two primary amino groups, especially aliphatic polyamines, are preferred.

Also suitable are high molecular weight hydrocarbyl polyamines typically formed by reacting aliphatic or alicyclic polyhalides (or mixture thereof) containing an average of at least about 40 carbon atoms with one or more amines, such as polyalkylene polyamines. Examples of such hydrocarbyl polyamines and the preparation thereof are described in U.S. Pat. Nos. 3,275,554; 3,438,757; 3,454,555; 3,565,804; 3,671,511; 3,821,302; 3,394,576; and in European Patent Publication No. 382,405, all disclosures of which are incorporated herein by reference. In general, the hydrocarbyl groups of these hydrocarbyl polyamines typically have a number average molecular weight in the range of about 500–10,000, more usually in the range of about 750–5,000, and often in the range of 1000–2500 and normally are of branched-chain structure, having 0–2 sites of unsaturation. The hydrocarbyl groups are typically derived from petroleum mineral oil, or polyolefins, either homopolymers or higher-order polymers, typically formed from 1-olefins of from 2–6 carbon atoms. such as ethylene, propylene, isobutylene, 1-butene, amylenes, etc., or combinations thereof.

Amino-substituted alkylene-poly(oxyalkylene) compounds

Alkylene-poly(oxyalkylene) monoamines and polyamines suitable for use in forming the products of this invention are typically amine-terminated compounds having an average of at least two polyoxyalkylene groups per molecule. Generally speaking these compounds have average molecular weights in the range of about 200 to about 10,000, and preferably in the range of about 200 to about 6000. The alkylene groups in these compounds can be the same or different and generally will each contain from 2 to 20, preferably from 2 to 10, more preferably from 2 to 5 and still more preferably from 3 to 4 carbon atoms. When different alkylene groups are present, these can be randomly disposed within the poly(oxyalkylene) chain or they can be arranged in blocks within the chain, such as for example one or more oxyethylene groups followed by a block of oxypropylene groups, or one or more oxyethylene groups followed by a block of oxybutylene groups followed by one or more oxyethylene groups, etc. Usually the alkylene groups will have the configuration:

—CHR"—CH$_2$— where R" is a hydrogen atom or a C$_1$–C$_{18}$ alkyl group, preferably a hydrogen atom or a C$_1$–C$_8$ alkyl group, more preferably a hydrogen atom or a C$_1$–C$_3$ alkyl group, and still more preferably a C$_1$–C$_2$ alkyl group, Compounds in which at least 90% of the oxyalkylene groups are oxypropylene (R" is methyl) or oxybutylene (R" is ethyl) or a combination of oxypropylene and oxybutylene groups are particularly preferred.

Various types of amine-terminated alkylene-poly(oxyalkylene) compounds can be used in forming the compounds of this invention. For example, amine-terminated alkylene-poly(oxyalkylene) compounds of formulas (3), (4) and (5) (or mixtures thereof) are well-suited for this purpose. Likewise amino-substituted alkylene-poly(oxyalkylene) compounds in which one or more alkylene group(s) and/or poly(oxyalkylene) group(s) are terminated by hydroxyl, tertiary amino groups, and/or hydrocarbyloxy group(s), e.g., alkoxy such as methoxy, ethoxy, etc., can be used.

Methods for the preparation of the amine-terminated alkylene-poly(oxyalkylene) compounds are known and reported in the literature. Indeed a number of such compounds are available as articles of commerce. By way of example, use can be made of products available under the Jeffamine trademark, such as Jeffamine® D-230, D-400, D-2000, D-4000, DU-700, ED-600, ED-900, ED-2001, ED-4000, ED-6000, T-403, T-3000, T-5000, DB-2001, and equivalent products. The Jeffamine® diamine D-series have the structure:

H$_2$NCHR"CH$_2$—(OCH$_2$CHR")$_x$—NH$_2$       (6)

where each R" is a methyl group. Individual products of this type are as indicated in the Table I.

TABLE I

| Product Designation | Value of x | Approximate Molecular Weight |
|---|---|---|
| D-230 | 2–3 | 230 |
| D-400 | 5–6 | 400 |
| D-2000 | 33 (Avg.) | 2,000 |
| D-4000 | 68 (Avg.) | 4,000 |

Jeffamine DB-2001 has the structure of Formula (6) above except that each R" is ethyl and the product has an approximate molecular weight of 2,000.

The Jeffamine ED-series of polyether diamines are depicted by the formula:

$$H_2NCHCH_2-(OCHCH_2)_a-(OCH_2CH_2)_b-(OCH_2CH)_c-NH_2 \quad (7)$$
$$\quad\ \ \ |\qquad\qquad\ \ |\qquad\qquad\qquad\qquad\qquad\ \ |$$
$$\quad\ \ CH_3\qquad\quad CH_3\qquad\qquad\qquad\qquad\quad CH_3$$

Individual products of this type are identified in the Table II.

TABLE II

| Product Designation | Approximate Value of b | Approximate Value of a + c | Approximate Molecular Weight |
|---|---|---|---|
| ED-600 | 8.5 | 2.5 | 600 |
| ED-900 | 15.5 | 2.5 | 900 |
| ED-2001 | 40.5 | 2.5 | 2,000 |
| ED-4000 | 86.0 | 2.5 | 4,000 |

Jeffamine DU-700 has the structure of Formula (3) above wherein each "alkylene" is an isopropylene group, and each of y and z is from 5 to 6.

The individual products of the T-series of Jeffamine® triamines have the structure of Formula (4) above in which each "alkylene" is an isopropylene group, and A is the hydrocarbyl residue of the triol initiator identified in the Table III.

TABLE III

| Product Designation | Triol Initiator | Approximate Molecular Wt. | Mols of Propylene Oxide |
|---|---|---|---|
| T-403 | Trimethylolpropane | 440 | 5-6 |
| T-3000 | Glycerine | 3,000 | 50 |
| T-5000 | Glycerine | 5,000 | 85 |

The reaction conditions used in the Mannich reaction involve temperatures in the range of from about 65° to about 160° C. The reactants are preferably employed in amounts such that there are from about 1 to about 4 mols of aldehyde and from about 0.5 to about 2 mols of polyamine per mole of phenolic reactant, and preferably from about 1 to about 2 mols of aldehyde and from about 0.5 to about 1 mol of polyamine per mole of phenolic reactant. The reaction can be conducted either in bulk (i.e., without a solvent) or in a suitable inert liquid diluent or solvent such as toluene, xylene, petroleum ethers, ligroin, etc. In either case, water evolved in the reaction is preferably removed from the reaction system. When conducting the process in bulk, reaction times of up to about 12 hours are typical. On the other hand, when conducting the process in a solvent, shorter reaction times can be employed. For example, when conducting the reaction in a diluent and removing the water via azeotropic distillation, reaction times in the range of from 0.5 to 2 hours can be used.

The Mannich base is then reacted with a dialkyl carbonate or phosgene followed by reaction with an amino-substituted alkylene-poly(oxyalkylene) compound having at least one primary amino group, and preferably two or more primary amino groups, in order to form a urea linkage involving an amino group of the Mannich base and an amino group of the polyamine. The reaction with the dialkyl carbonate is typically conducted at a temperature in the range of about 60° to about 140° C. On the other hand, when using phosgene, lower temperatures will generally be used such as temperatures in the range of about 30° to about 45° C. The reaction of the resultant carbamate with the amino-substituted alkylene-poly(oxyalkylene) compound to form the urea linkage is usually conducted at a temperature in the range of about 60° to about 140° C., although other temperatures can be used.

The following examples illustrate the manner by which various products of this invention can be prepared. These examples are not intended to limit, do not limit, and should not be interpreted as limiting the practice of the generic aspects of this invention.

EXAMPLE 1

Preparation of Mannich Base Intermediate

To a reaction flask equipped with a stirrer, a Dean-Stark trap, and a heating mantle, are charged 262.4 grams (1.0 mol) of 4-dodecylphenol, 30 grams (1.0 mol) of paraformaldehyde, 103.7 grams (1.0 mol) of diethylene triamine, and 250 Ml of xylene. While stirring, the mixture is heated to reflux and water evolved during the reaction is collected in the Dean-Stark trap. When approximately 17.8 Ml of water has been collected, a vacuum is applied to the system, and the reaction mixture is concentrated by distilling off xylene diluent and traces of residual water, if any.

EXAMPLE 2

Conversion of Mannich Base to a Jeffamine D-2000 Amine Derivative

Into a reaction vessel are charged 47.1 grams (0.125 mol) of a Mannich base product formed as in Example 1, 11.3 grams (0.125 mol) of dimethyl carbonate, and 200 grams of xylene. The mixture is heated at 90° C. for 3 hours. Thereupon 250 grams (0.125 mol) of polyoxyalkylene diamine having an average molecular weight of about 2000 (Jeffamine D-2000 amine) and 5 grams of Amberlyst® 15 resin (a highly acidic ion exchange resin available from Rohm & Haas) are charged to the reaction mixture which is then refluxed for 3 hours. The product is cooled, filtered and concentrated by distillation at reduced pressure. Typically the product is formed in yields of at least 85%.

EXAMPLE 3

Conversion of Mannich Base to a Jeffamine D-400 Amine Derivative

Charged to a reaction vessel are 94.3 grams (0.25 mol) of a Mannich base product formed as in Example 1, 22.5 grams (0.25 mol) of dimethyl carbonate and 200 Ml of xylene. This mixture is heated at 85° C. for 3 hours with stirring. Then 100 grams (0.25 mol) of polyoxyalkylene diamine having an average molecular weight of about 400 (Jeffamine D-400 amine) is charged and the resultant mixture is heated with continuous stirring at 100° C. for 1 hour and then at 165° C. for 3 hours. The product is worked up and recovered as in Example 2. Yields of over 95% are typical.

EXAMPLE 4

Conversion of Mannich Base to Jeffamine T-403 Amine Derivatives

The procedure of Example 3 is repeated except that the Jeffamine D-400 amine is replaced in one case by 0.25 mol of Jeffamine T-403 amine. In another case the amount of Jeffamine T-403 amine is reduced to 0.125 mol to produce a bis-Mannich urea linked product of formula (5) above wherein n is 2.

EXAMPLE 5

Conversion of Mannich Base to a Jeffamine DB-2001 Amine Derivative

The procedure of Example 2 is repeated except that the Jeffamine D-2000 amine is replaced by 0.125 mol of Jeffamine DB-2001 amine.

EXAMPLE 6

Conversion of Mannich Base to a Jeffamine ED-600 Amine Derivative

The procedure of Example 3 is repeated except that the Jeffamine D-400 amine is replaced by 0.25 mol of Jeffamine ED-600 amine.

EXAMPLE 7

Conversion of Mannich Base to a Jeffamine DU-700 Amine Derivative

The procedure of Example 3 is repeated except that the Jeffamine D-400 amine is replaced by 0.25 mol of Jeffamine DU-700 amine.

EXAMPLES 8–25

Conversion of Mannich Bases to Various Polyoxyalkylene Polyamine Derivatives The procedures of Examples 2 through 7 are repeated three times. In Examples 8–13, the procedures of Examples 2 through 7, respectively, are applied to corresponding molar quantities of a Mannich base prepared as in Example 1 except that the diethylene triamine thereof is replaced by one mole of triethylene tetramine. In Examples 14–19, the procedures of Examples 2 through 7, respectively, are applied to corresponding molar quantities of a Mannich base prepared as in Example 1 except that the diethylene triamine thereof is replaced by one mole of tetraethylene pentamine. And in Examples 20–25, the procedures of Examples 2 through 7, respectively, are applied to corresponding molar quantities of a Mannich base prepared as in Example 1 except that the diethylene triamine thereof is replaced by one mole of pentaethylene hexamine.

EXAMPLE 26

Preparation Of Mannich Base Intermediate

Using the procedure of Example 1, a longer chain Mannich base intermediate is formed by replacing the 4-dodecylphenol with 1.0 mole of a 4-alkylphenol formed by alkylating phenol with a polypropylene having a molecular weight (by vapor phase osmometry) of about 910.

EXAMPLES 27–32

Conversion of Mannich Base to Various Polyoxyalkylene Polyamine Derivatives

The procedures of Examples 2 through 7 are repeated except that in every instance the Mannich base of Example 26 is used in lieu of the Mannich base of Example 1.

EXAMPLES 33–50

Conversion of Mannich Bases to Various Polyoxyalkylene Polyamine Derivatives The procedures of Examples 27 through 32 are repeated three times. In Examples 33–38, the procedures of Examples 27 through 32, respectively, are applied to corresponding molar quantities of a Mannich base prepared as in Example 26 except that the diethylene triamine thereof is replaced by one mole of triethylene tetramine. In Examples 39–44, the procedures of Examples 27 through 32, respectively, are applied to corresponding molar quantities of a Mannich base prepared as in Example 26 except that the diethylene triamine thereof is replaced by one mole of tetraethylene pentamine. And in Examples 45–50, the procedures of Examples 27 through 32, respectively, are applied to corresponding molar quantities of a Mannich base prepared as in Example 26 except that the diethylene triamine thereof is replaced by one mole of pentaethylene hexamine.

EXAMPLE 51

Preparation of Mannich Base Intermediate

Example 1 is repeated with the sole exception that the proportions are modified so that 0.6 mol of diethylene triamine, 1.3 mols of paraformaldehyde and 1.0 mol of 4-dodecylphenol are used.

EXAMPLES 52–57

Conversion of Mannich Base to Various Polyoxyalkylene Polyamine Derivatives

The procedures of Examples 2 through 7 are repeated except that in every instance the Mannich base of Example 51 is used in lieu of the Mannich base of Example 1.

EXAMPLES 58–75

Conversion of Mannich Bases to Various Polyoxyalkylene Polyamine Derivatives The procedures of Examples 52 through 57 are repeated three times. In Examples 58–63, the procedures of Examples 52 through 57, respectively, are applied to corresponding molar quantities of a Mannich base prepared as in Example 51 except that the diethylene triamine thereof is replaced by 0.6 mole of triethylene tetramine. In Examples 64–69, the procedures of Examples 52 through 57, respectively, are applied to corresponding molar quantities of a Mannich base prepared as in Example 51 except that the diethylene triamine thereof is replaced by 0.6 mole of tetraethylene pentamine. And in Examples 70–75, the procedures of Examples 52 through 57, respectively, are applied to corresponding molar quantities of a Mannich base prepared as in Example 51 except that the diethylene triamine thereof is replaced by 0.6 mole of pentaethylene hexamine.

EXAMPLE 76

Preparation of Mannich Base Intermediate

Using the procedure of Example 51, a longer chain Mannich base intermediate is formed by replacing the 4-dodecylphenol with 1.0 mole of a 4-alkylphenol formed by alkylating phenol with a polypropylene having a molecular weight (by vapor phase osmometry) of about 910.

EXAMPLES 77–82

Conversion of Mannich Base to Various Polyoxyalkylene Polyamine Derivatives

The procedures of Examples 2 through 7 are repeated except that in every instance the Mannich base of Example 76 is used in lieu of the Mannich base of Example 1.

EXAMPLES 83–100

Conversion of Mannich Bases to Various Polyoxyalkylene Polyamine Derivatives The procedures of Examples 77 through 82 are repeated three times. In Examples 83–88, the procedures of Examples 77 through 82, respectively, are applied to corresponding molar quantities of a Mannich base prepared as in Example 76 except that the diethylene triamine thereof is replaced by 0.6 mole of triethylene tetramine. In Examples 89–94, the procedures of Examples 77 through 82, respectively, are applied to corresponding molar quantities of a Mannich base prepared as in Example 76 except that the diethylene triamine thereof is replaced by 0.6 mole of tetraethylene pentamine. And in Examples 95–100, the procedures of Examples 77 through 82, respectively, are applied to corresponding molar quantities of a Mannich base prepared as in Example 76 except that the diethylene triamine thereof is replaced by 0.6 mole of pentaethylene hexamine.

The compounds of this invention are useful as additives for fuels and lubricants wherein they can be used either as detergent/dispersants or as rust or oxidation inhibitors. To assess their effectiveness as detergents use may be made of comparative engine tests in which the amount of intake valve deposits (IVD) formed when operating the engine for a test period of 150 hours on the test fuel is determined. The base fuel used in such tests is an additive-free gasoline. Each test starts with a clean intake valve and upon completion of the 150-hour test, the weight of the intake valve deposits is determined. The lower the weight of deposits, the more effective the composition. Standard test procedures can be used to assess the effectiveness of the compounds of this invention as carburetor detergents and as rust or oxidation inhibitors.

Generally speaking, the fuels will contain a suitable amount in the range of up to about 2% by weight of a compound of this invention. The fuels can be any distillate fuel such as gasoline (including so-called reformulated gasolines which contain oxygenates such as alcohols and/or ethers), diesel fuels, kerosenes, jet fuels, burner fuels, home heating oils, gas oils, and the like. Typically, the compounds of this invention are employed in gasoline at suitable concentrations in the range of about 50 to about 300 pounds per thousand barrels (ptb), and preferably in the range of about 150 to about 300 ptb. Preferably, the compounds of this invention are formulated with an appropriate carrier fluid such as a mineral oil carrier fluid or polyol carrier fluid. Proportions will typically fall in the range of from 0.5 to 5 parts by weight of carrier fluid per part by weight of compound of this invention.

Table IV summarizes results of intake valve deposit tests conducted in the above manner. Fuel A contained 100 ptb of Mannich base dispersant prepared as in Example 1, and thus is not a fuel of this invention. Fuels B and C each contained 100 ptb of a product prepared as in Example 2, and thus are fuels of this invention. The additives of Fuels A and B were both formulated with 2 parts by weight of mineral oil carrier fluid per part by weight of dispersant. In Fuel C the carrier fluid was 0.8 part by weight of a polyol (Jeffamine D-2000) per part by weight of dispersant.

TABLE IV

| Fuel | Dispersant | Carrier Fluid | IVD, mg |
|---|---|---|---|
| A (Comparative) | Example 1 | Mineral Oil | 720 |
| B (Invention) | Example 2 | Mineral Oil | 41 |
| C (Invention) | Example 2 | Polyol | 17 |

The compounds of this invention are also suitable for use in natural and synthetic oils of lubricating viscosity. Amounts in the range of from about 0.5 to about 5% based on the weight of the finished lubricant or functional fluid composition are generally sufficient to provide effective dispersancy. The compounds of this invention exhibit good compatibility with conventional lubricant additives such as metal-containing detergents, antiwear agents, extreme pressure agents, corrosion inhibitors, foam inhibitors, friction modifiers, viscosity index improvers, pour point depressants, oxidation inhibitors, and the like.

This invention is susceptible to considerable variation in its practice. Accordingly, this invention is not intended to be limited by the specific exemplifications set forth hereinabove. Rather, this invention is intended to cover the subject matter within the spirit and scope of the appended claims and the permissible equivalents thereof.

I claim:

1. A compound in which a phenolic moiety is linked by a Mannich base linkage to a polyamine moiety, and the polyamine moiety is linked to an alkylene-poly(oxyalkylene) moiety by a urea linkage involving one of the nitrogen atoms of the polyamine moiety.

2. A compound in accordance with claim 1 having the formula:

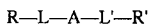

R—L—A—L'—R' wherein R is a phenolic group derived from a hydroxyaromatic reactant; A is a polyamine group having 2 to 10 nitrogen atoms, and is derived from a polyamine; R' is an alkylenepoly(oxyalkylene) group derived from an alkylenepoly(oxyalkylene) polyamine reactant in which the alkylenes can be the same or different and contain from 2 to 20 carbon atoms each; L is a Mannich base linkage in which the amino nitrogen atom is one of the nitrogen atoms of the polyamine group; and L' is a urea linkage in which one of the nitrogen atoms of L' is one of the nitrogen atoms of the polyamine group and the other nitrogen atom of L' is a nitrogen atom of an amino group bonded to the alkylenepoly(oxyalkylene) group.

3. A compound in accordance with claim 2 wherein the alkylenes contain 2 to 10 carbon atoms each, linkage L has the formula —CH$_2$—NH—, each nitrogen atom of linkage L' is substituted by a single hydrogen atom, and the amino-substituted alkylenepoly(oxyalkylene) polyamine reactant from which R' is derived has two terminal primary amino groups.

4. A compound in accordance with claim 3 wherein the alkylenes contain 3 to 4 carbon atoms each.

5. A compound in accordance with claim 3 wherein the alkylenepoly(oxyalkylene) polyamine reactant from which R' is derived has three terminal primary amino groups.

6. A compound in accordance with claim 5 wherein the alkylenes contain 3 to 4 carbon atoms each.

7. A compound in accordance with claim 2 wherein the average number of oxyalkylenes in the compound is in the range of about 5 to about 90, the phenolic group is a mononuclear phenolic group having from 1 to 2 acyclic hydrocarbyl substituents on the ring thereof, the alkylenes contain 2 to 5 carbon atoms each, and the polyamine from which A is derived has 3 to about 6, or an average between 3 and 6, of amino nitrogen atoms.

8. A compound in accordance with claim 2 wherein the hydroxyaromatic reactant from which R is derived is a monoalkylphenol in which the alkyl group has up to about 500 carbon atoms.

9. A compound in accordance with claim 2 wherein the hydroxyaromatic reactant from which R is derived is a monoalkylated phenol in which the alkyl substituent is derived from an oligomer or polymer of propene having from 4 up to about 100 propene units per molecule.

10. A compound in accordance with claim 2 wherein the hydroxyaromatic reactant from which R is derived is a monoalkylated phenol in which the alkyl substituent is derived from a polymer of propene having a molecular weight by vapor phase osmometry in the range of about 800 to about 1000.

11. A compound in accordance with claim 2 wherein R' is an amino-substituted alkylenepoly(oxyalkylene) group derived by removal of one amino hydrogen atom from a polyamino-substituted alkylenepoly(oxyalkylene) reactant of the formula:

$$H_2N\text{-alkylene-(O-alkylene)}_x\text{—NH}_2$$

wherein the alkylenes can be the same or different and contain from 2 to 5 carbon atoms each, and x is an average number in the range of about 10 to about 80.

12. A compound in accordance with claim 2 wherein R' is an amino-substituted alkylenepoly(oxyalkylene) group derived by removal of one amino hydrogen atom from a polyamino-substituted alkylenepoly(oxyalkylene) reactant of the formula:

$$H_2N\text{-alkylene-(O-alkylene)}_y\text{—NH—CO—NH—(O-alkylene)}_z\text{-alkylene-NH}_2$$

wherein the alkylenes can be the same or different and contain from 2 to 5 carbon atoms each, and y and z can be the same or different and each is an average number in the range of from 2 to 20.

13. A compound in accordance with claim 2 wherein R' is a polyamino-substituted alkylenepoly(oxyalkylene) group derived by removal of one amino hydrogen atom from a polyamino-substituted alkylenepoly(oxyalkylene) reactant of the formula:

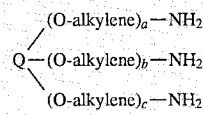

wherein the alkylenes can be the same or different and contain from 2 to 5 carbon atoms each, Q is the hydrocarbyl residue of a triol, and a, b and c can be the same or different and each is an average number in the range of from 1 to about 35, the sum of a, b and c being in the range of about 5 to about 100.

14. A compound in accordance with claim 1 wherein the polyamine moiety is derived from a mixture of straight chain, branched chain and cyclic ethylene polyamines having about 2 to about 10 nitrogen atoms in the molecule, and wherein the alkylenes of said alkylenepoly(oxyalkylene) moiety contain 3 carbon atoms each.

15. A compound in accordance with claim 1 having the formula:

$$[R\text{—L—A—L'—}]_nR'$$

wherein n is 2 or 3 or an average number between 2 and 3; R is a phenolic group derived from a hydroxyaromatic reactant; A is a polyamine group having 2 to 10 nitrogen atoms, and is derived from a polyamine; L is a Mannich base linkage in which the amino nitrogen atom is one of the nitrogen atoms of the polyamine group; R' is an alkylenepoly(oxyalkylene) group derived by removal from a polyamino-substituted alkylenepoly(oxyalkylene) reactant of a number of amino hydrogen atoms equal to n; and L' is a urea linkage in which one of the nitrogen atoms of L' is one of the nitrogen atoms of the polyamine group and the other nitrogen atom of L' is a nitrogen atom of an amino group bonded to the alkylenepoly(oxyalkylene) group.

16. A compound in accordance with claim 15 wherein the alkylenes contain 2 to 10 carbon atoms each, linkage L has the formula —$CH_2$—NH—, each nitrogen atom of linkage L' is substituted by a single hydrogen atom, and the alkylenepoly(oxyalkylene) reactant from which R' is derived has two or three terminal primary amino groups.

17. A compound in accordance with claim 16 wherein the alkylenes contain 3 to 4 carbon atoms each.

18. A process for the preparation of a compound of claim 1 which comprises reacting a Mannich base with a dialkylcarbonate or phosgene and at least one amino-substituted alkylenepoly(oxyalkylene) compound, said Mannich base being a product of reaction among a hydroxyaromatic compound, an aldehyde and one or more polyamines having 2 to 10 nitrogen atoms per molecule.

19. A process according to claim 18 wherein said amino-substituted alkylenepoly(oxyalkylene) compound has the formula:

$$H_2N\text{-alkylene(O-alkylene)}_n\text{—NH}_2$$

wherein the alkylenes can be the same or different and contain from 2 to 20 carbon atoms each, and n is a number in the range of 2 to 150.

20. A process according to claim 19 wherein the alkylenes contain 3 to 4 carbon atoms each; and wherein the Mannich base is a product of reaction among a monoalkylated mononuclear phenol in which the alkyl substituent is derived from an oligomer or polymer of propene having from 4 up to about 100 propene units per molecule, formaldehyde or a formaldehyde precursor, and an alkylene polyamine having 2 to about 6 nitrogen atoms per molecule.

21. A process according to claim 18 wherein said amino-substituted alkylenepoly(oxyalkylene) compound has the formula:

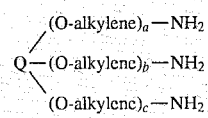

wherein the alkylenes can be the same or different and contain from 2 to 20 carbon atoms each, Q is the hydrocarbyl group of a triol, and a, b and c are numbers in the range of 1 to about 35 with the total of a, b and c being in the range of about 5 to about 100.

22. A process according to claim 21 wherein the alkylenes contain 3 to 4 carbon atoms each; and wherein the Mannich base is a product of reaction among a monoalkylated mononuclear phenol in which the alkyl substituent is derived from an oligomer or polymer of propene having from 4 up to about 100 propene units per molecule, formaldehyde or a formaldehyde precursor, and an alkylene polyamine having 2 to about 6 nitrogen atoms per molecule.

23. A distillate fuel for use in an internal combustion engine containing a compound in accordance with claim 1 in an amount at least sufficient to control induction system deposit formation.

24. A fuel in accordance with claim 23 additionally containing in the range of from about 0.5 to 5 parts by weight of carrier fluid per part by weight of said compound.

25. An additive composition for addition to fuel for internal combustion engines which comprises a compound in accordance with claim 1 and in the range of from about 0.5 to 5 parts by weight of carrier fluid per part by weight of said compound.

* * * * *